United States Patent [19]

Barr et al.

[11] Patent Number: 5,688,538
[45] Date of Patent: Nov. 18, 1997

[54] APPARATUS FOR THREE DIMENSIONAL SURFACE SHAPING OF SYNTHETIC FOAM

[75] Inventors: Arthur Barr, Riverside; Lewis Sturgill, Fontana; Jose De Jesus Munoz Contreras, Rancho Cucamonga, all of Calif.

[73] Assignee: Foamex L.P., Linwood, Pa.

[21] Appl. No.: 675,747

[22] Filed: Jul. 3, 1996

Related U.S. Application Data

[62] Division of Ser. No. 477,282, Jun. 7, 1995, Pat. No. 5,534,208, which is a continuation of Ser. No. 122,701, Sep. 15, 1993, abandoned.

[51] Int. Cl.$^6$ ................................................... B26D 7/14
[52] U.S. Cl. ................................ 425/299; 5/468; 5/498; 5/501; 83/19; 83/176; 264/160; 264/163; 264/284; 264/DIG. 82; 425/304; 425/363; 425/385
[58] Field of Search ..................... 264/46.3, 48, 145, 264/158, 160, 163, 284, 293, DIG. 82; 425/4 C, 289, 299, 304, 362, 363, 385, 817 C; 83/19, 176; 5/468, 491, 901

[56] References Cited

U.S. PATENT DOCUMENTS

| | | | |
|---|---|---|---|
| 3,081,496 | 3/1963 | Moore | 264/46.3 |
| 3,370,117 | 2/1968 | Blue | 264/48 |
| 4,148,855 | 4/1979 | Stalter et al. | 264/293 |
| 4,603,445 | 8/1986 | Spahn | 5/481 |
| 4,700,447 | 10/1987 | Spahn | 264/284 |
| 4,901,387 | 2/1990 | Luke | 5/464 |
| 5,252,278 | 10/1993 | Spahn et al. | 264/138 |
| 5,477,573 | 12/1995 | Bonaddio et al. | 264/284 |
| 5,534,208 | 7/1996 | Barr et al. | 425/304 |

FOREIGN PATENT DOCUMENTS

| | | |
|---|---|---|
| 551358 | 8/1956 | Belgium . |
| 1336014 | 7/1963 | France . |
| 9010105.7 | 10/1990 | Germany . |

*Primary Examiner*—Jay H. Woo
*Assistant Examiner*—Duane S. Smith
*Attorney, Agent, or Firm*—Natan Epstein

[57] ABSTRACT

Synthetic foam compressed between a pattern roller and a smooth compression roller is driven against a cutting edge closely adjacent and tangent to the pattern surface but spaced from the compression roller to reproduce a three dimensional pattern roller surface on the foam sheet. Three dimensional patterns of arbitrary geometries including sharp edged, flat surfaced geometric solids can be reproduced on a foam surface.

21 Claims, 4 Drawing Sheets

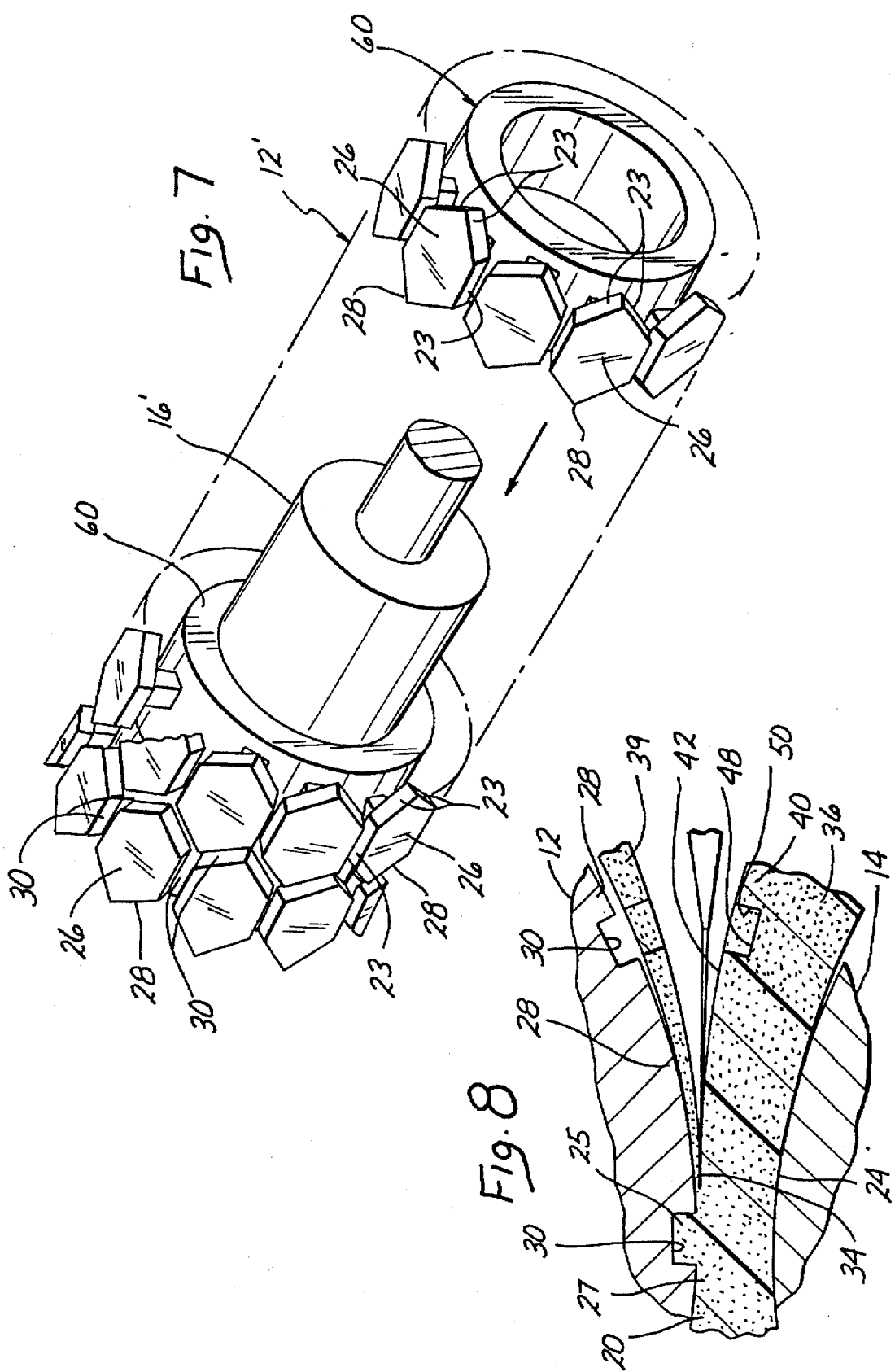

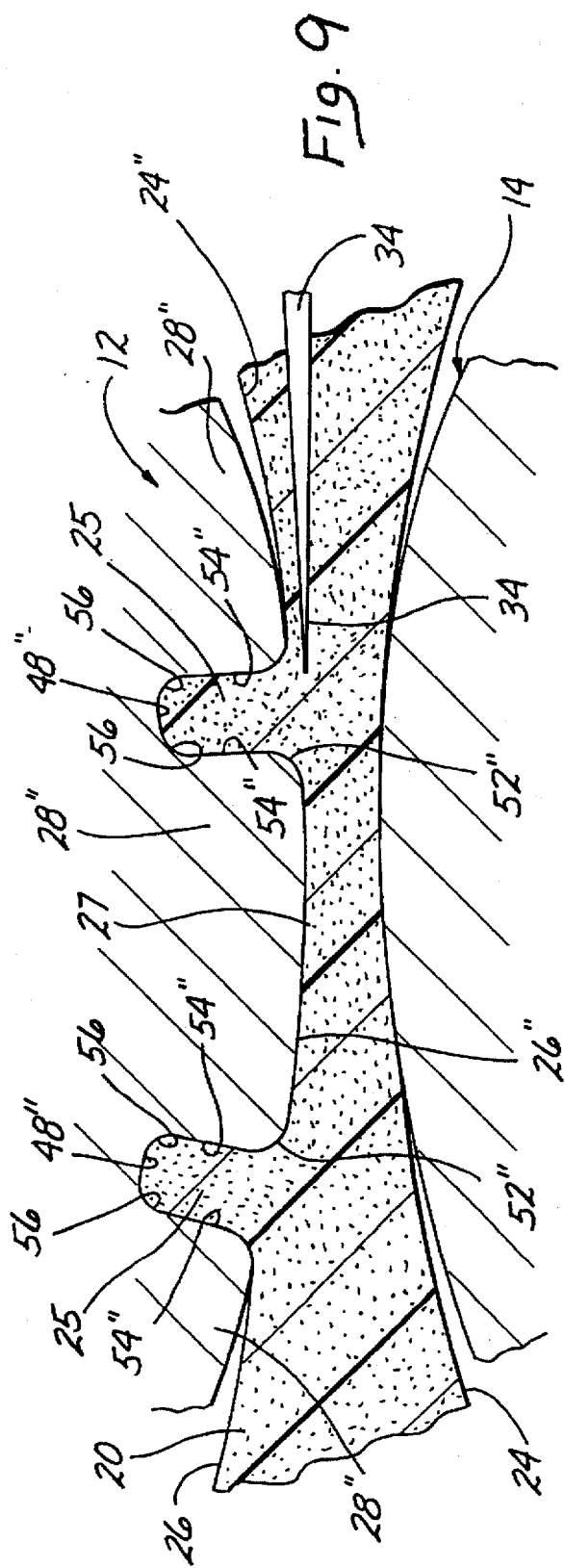
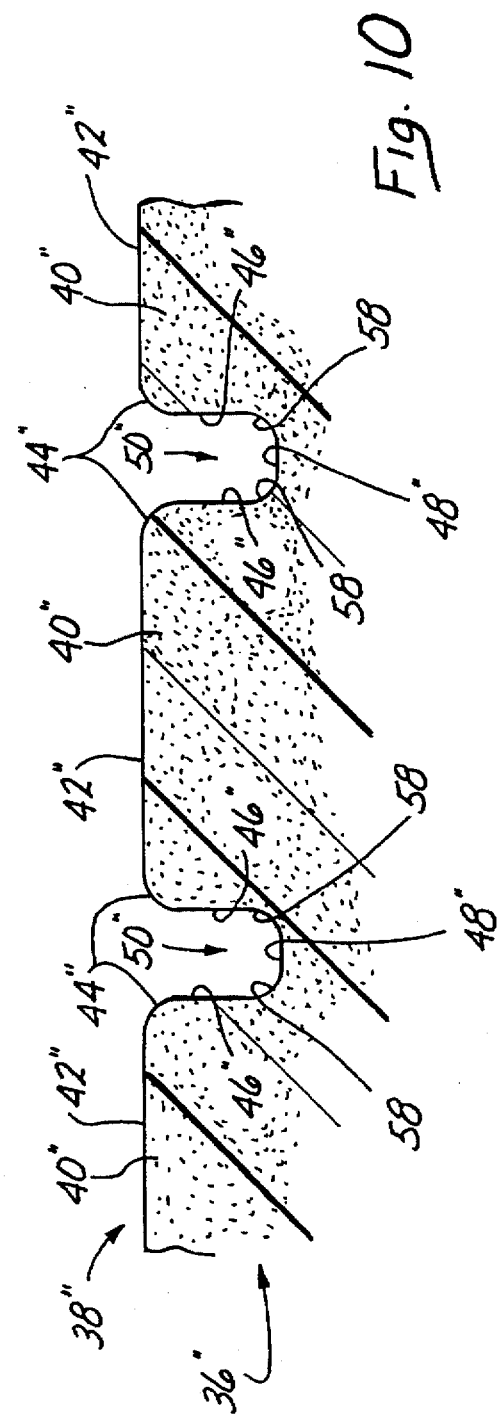

APPARATUS FOR THREE DIMENSIONAL SURFACE SHAPING OF SYNTHETIC FOAM

This application is a divisional of application Ser. No. 08/477,282, filed Jun. 7, 1995, now U.S. Pat. No. 5,534,208 which is a continuation of application Ser. No. 08/122,701, filed Sep. 15, 1993, now abandoned.

BACKGROUND OF THE INVENTION

1. Field of the Invention

This invention relates generally to the field of mattresses, pads and cushions made of resilient synthetic foam and in particular is directed to an improved method for making the same by a novel continuous rotary process.

2. Background of the Invention

Synthetic foam has been widely used to make mattress overlay pads and similar articles intended to cushion the body of a person resting on a supporting surface. In general, such pads seek to provide controlled support by conforming to the natural contours of the user's anatomy so as to avoid areas of concentrated pressure. These areas diminish the user's comfort, and if allowed to persist, the diminished blood flow through the affected tissues frequently leads to painful and slow healing skin ulcerations, which are particularly common among the bed ridden and persons confined to a wheel chair.

Considerable effort has been expended to improve the distribution of pressure over the user's anatomy and provide air flow under the person's body to avoid excessive concentration of heat and humidity which is detrimental to comfort and well being. Many different convoluted pad geometries have been developed as a result. Such pads commonly have a convoluted surface with protuberances arranged in a regular pattern and separated by depressions, so as to afford ventilation underneath the users' body while the protuberances serve as individually compressible cushions capable of responding to varying local pressure over the pad surface. One early configuration was the "egg crate" convoluted pad, in which the supporting surface was dimpled with rounded peaks and depressions in a checkerboard pattern. The convoluted surface is formed by passing a rectangular slab of synthetic foam through a convoluter machine which has a pair of rollers with opposed spaced projecting members arranged in a pattern corresponding to the geometry of the convoluted surface. As the pad passes between and is compressed by the rollers, the pad is sliced by a blade or saw in a transverse plane midway between the rollers. The result is a pair of convoluted pads each having a dimpled surface created by the cutting of the selectively compressed slab. The geometry of the dimpled surface obtainable by this method is limited in that the convoluted surface generally has a sinuous configuration. The elevations as well as the depressions have continuous curvature, and the elevations on the convoluted surface tend to come to a rounded or pointed peak. In many cases this geometry is undesirable in that the peaks tend to concentrate pressure on the body of the person resting on the pad with adverse consequences to blood circulation in the skin and underlying soft tissue. If soft foam is employed to alleviate this problem, the peaks tend to flatten and do not provide sufficient support.

Also, convoluter machines form two complementary convoluted surfaces simultaneously by slicing a single foam slab lengthwise between the rollers of the convoluting machine. That is, the body support surfaces of the resulting pads are created by slicing in half the foam slab, and no part off these support surfaces existed in the original slab. The consequence is that the depressions on one pad are formed by slicing away foam which becomes a projection on the other pad, the projections of each pad thus mating into the depressions of the other pad. Consequently, the convoluted surface is equally divided between the raised areas and the depressions, limiting the support provided by the projections which may tend to flatten more easily than is desirable for effective body support. Some of these shortcomings are addressed by Spann in U.S. Pat. No. 4,603,445 which obtains flat topped elevations on convoluted pads in a convoluter roller machine.

Alternative methods of making foam pads exist which avoid these difficulties. One such alternative approach, exemplified by U.S. Pat. No. 4,901,387 issued to Luke, is to saw a foam slab with a computer controlled foam saw machine in which the saw blade spans the width of the foam slab, and the blade moves vertically and horizontally and tilts as needed to cut out the desired contour of the convoluted pad surface, usually by cutting channels which define geometric blocks with flat top surfaces. This method is relatively slow, and is limited to relatively simple geometries of the foam pad supporting surface.

A second alternative method of making support pads, used by Forster in U.S. Pat. No. 4,383,342, is by injecting the foam into a mold cavity. While a wide variety of foam pad surface geometries can be obtained by this method, a rather complex foam injection machine is required and the foam must be formed in the mold cavity from precursor chemicals, so that the process involves both the making of the foam as well as the shaping of the pad, which occur simultaneously.

What is needed is a method and apparatus which retains the simplicity and continuity of operation of the convoluter machine, but overcomes the limitations of the prior art to allow production of convoluted pads with a wide range of possible geometric shapes of the raised portions of the convoluted surface including flat tops on the raised areas, and channels or depressions of arbitrary width between the raised areas of the support surface.

SUMMARY OF THE INVENTION

This invention provides a method and apparatus for making body support pads of synthetic foam having a three dimensionally shaped body support surface characterized by raised portions separated by depressions. The novel method is carried out by providing a slab of synthetic foam having a planar surface, and providing a die having raised portions separated by depressions. The planar surface of the foam slab is pressed against the die surface with sufficient force to extrude foam portions of the slab into the depressions of the die, and cutting the foam slab while pressed against the die surface along a cutting plane substantially flush with the raised portions of the die thereby to sever the extruded foam portions from the slab. An existing surface of the foam slab is shaped to a three dimensional geometry by selective removal of foam portions on the existing surface. This method is therefore distinct from convoluting processes which form entirely new convoluted foam surfaces by slicing a foam slab in half to simultaneously make two convoluted pads.

The die surface is preferably on a cylindrical roller and the cutting plane is substantially tangent to the roller circumference. The raised portions of the die surface may have planar top surfaces which lie tangent to an imaginary roller circumference. The planar top surfaces may have radiused edges for a smooth transition between the top surface and the side surfaces of the raised portions. This die surface in combination with the novel method of this invention produces shaped foam pad surfaces characterized by raised portions with planar top surfaces which distribute pressure over wider portions of the user's body, but which planar top surfaces have smoothly rounded, contoured edges at the intersection of the flat end and the side surfaces of the raised portions of the shaped foam surface, a novel feature in foam pads formed by a continuous rotary process.

The raised portions of the shaped foam surface made according to this invention may have any arbitrary shape as seen in top plan view, and in particular may have regular or irregular polyhedral prismatic shapes with any number of sides. For example, the raised elements of the die surface may be straight hexagonal prisms each ending in a flat end surface with a radiused transition between the six sides of the prism and the flat end surface.

Yet another advantage of the method of this invention is that the combined die surface area occupied by the raised portions may be much greater than the combined die surface area occupied by the depressions. This permits the manufacture of three dimensionally shaped surfaces characterized by raised portions having wide planar end surfaces separated by relative narrow depressions in the pad surface. This geometry maximizes the distribution of supporting force against the body of the patient and improves the resistance of the raised portions against excessive flattening, while preserving independent spring action between adjacent raised portions as well as providing for air circulation and ventilation between the raised portions.

A rotary process machine for practicing the method of this invention has a roller assembly which includes a die roller defining a die surface and a pressure roller having a substantially smooth surface. These rollers are driven in mutually opposite senses of rotation, and blank foam slabs are fed from an input side into the roller assembly. The rollers are spaced so that one surface of the slab is pressed against the die surface by the pressure roller, and portions of the foam slab are extruded into the depressions separating raised portions on the die surface. A cutting edge is positioned on the outlet side of the rollers so as to cut off the foam portions extruded into the depressions of the die surface. Foam portions which are compressed into the slab by the raised portions of the die surface are not significantly cut. As the slab emerges from the roller assembly, the uncut foam portions are released from compression and spring up to form the raised portions of the shaped surface of the foam pad, these raised portions being separated by depressions formed by slicing away the extruded foam portions. The finished, shaped foam surface is substantially a mirror image of the die surface geometry laid out on the initially flat surface of the foam slab.

These and other improvements, advantages and features of the present invention will be better understood by reference to the following detailed description of the preferred embodiments, taken in conjunction with the accompanying drawings.

BRIEF DESCRIPTION OF THE DRAWINGS

FIG. 7 is a perspective view illustrating the assembly of die rings on a shaft to make a die roller;

FIG. 8 is an enlarged detail of FIG. 2 showing the compressed foam slab being sliced between the die and pressure rollers;

FIG. 9 is an enlarged detail cross-sectional view as in FIG. 8 showing a foam pad pressed against a die roller having radiused edges at the end surfaces as well as within the recesses between the raised portions;

FIG. 10 is an enlarged detail cross-sectional view of a foam support surface with rounded top and bottom edges obtained with the die roller of FIG. 9.

DETAILED DESCRIPTION OF THE PREFERRED EMBODIMENTS

Figure 1:
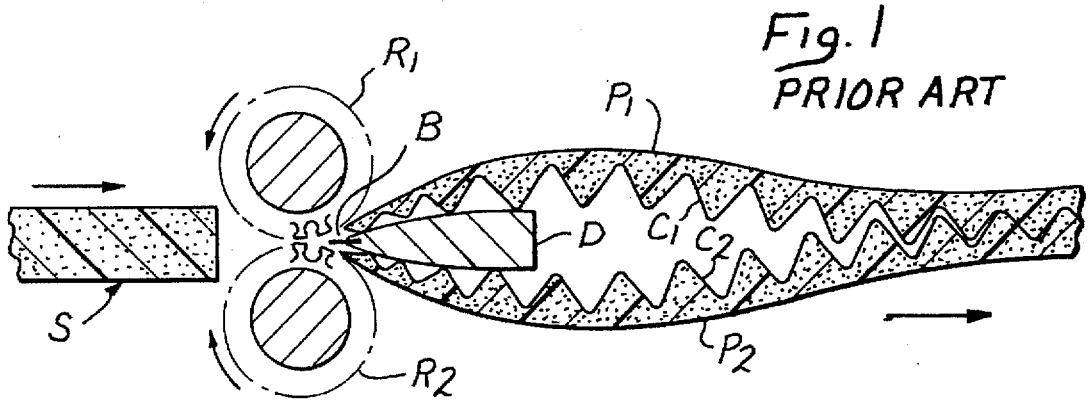
FIG. 1 is a longitudinal sectional view illustrating the conventional fabrication of two convoluted pads by slicing a single foam blank slab between a pair of convoluter rollers.

With reference to the drawings, in which like numerals designate similar elements, FIG. 1 is a longitudinal view illustrating the prior art manufacture of convoluted foam pads. A rectangular slab of synthetic foam S is fed from left to right in the drawing between two convoluter rollers R1 and R2 which are driven for rotation in opposite senses as indicated by the arrows. The two rollers are mounted with their axes parallel to each other and spaced apart so that a gap exists between the outer circumference of the two rollers, which gap is considerably smaller than the thickness of foam slab S. The slab is therefore compressed between the rollers and as the slab emerges from the rollers, it is sliced at mid-thickness into two convoluted foam pads P1 and P2 by a cutting blade B which are separated by a spreader D. Each roller R1 and R2 has radial projections which can take a variety of geometric shapes, and the arrangement of these radial projections on each roller can take a variety of regular or irregular patterns. The radial projections compress portions of the foam slab S, while other portions of the slab passing between the radial projections are not compressed. As the slab S is sliced along its center while in this condition of selective compression, two mutually complementary convoluted surfaces C1 and C2 result on the two foam pads P1 and P2. This general process and the convoluter machinery used for this purpose are known and in wide use. However, the convoluted surfaces C1 and C2 of the resulting foam pads suffer from certain limitations and shortcomings which have been described in the preceding introductory portions of this disclosure.

Figure 2:
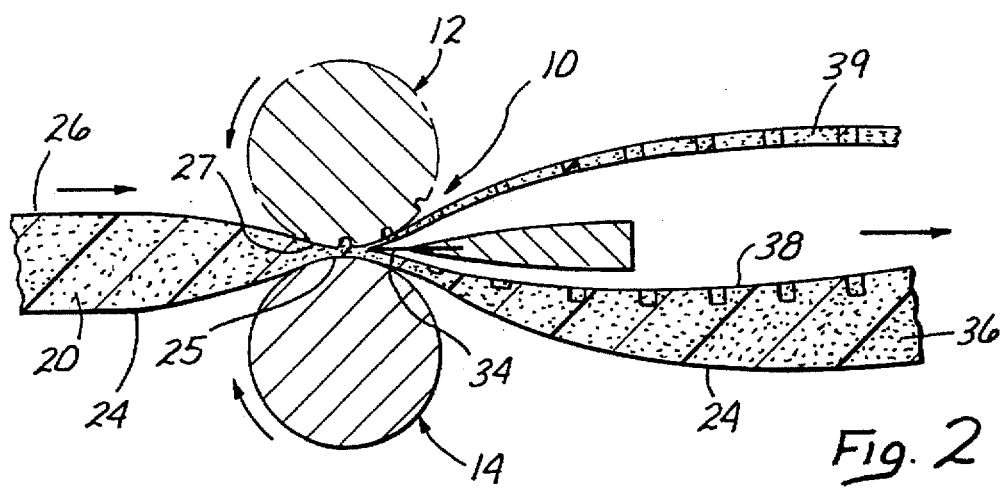
FIG. 2 is a longitudinal sectional view showing a rotary machine arrangement according to the present invention by which a single foam slab is cut to make one pad with a shaped surface and a scrap layer of foam.
Figure 3:
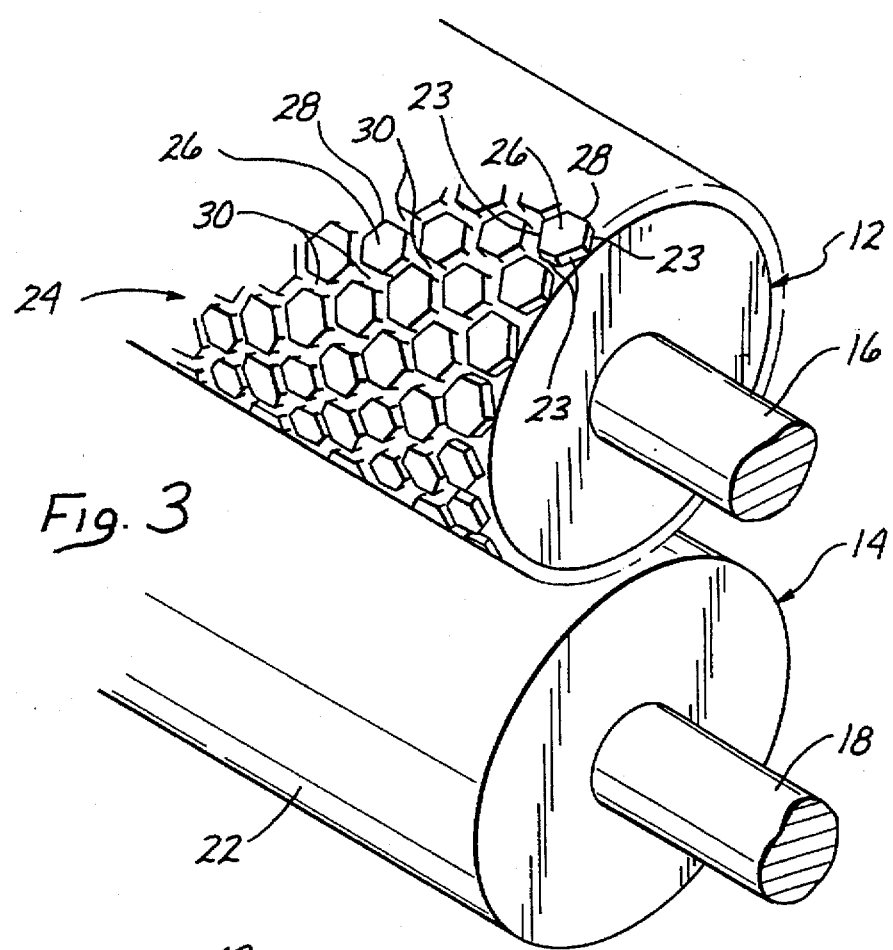
FIG. 3 is a detailed perspective view showing the roller assembly according to this invention, including a typical die roller and a smooth surfaced pressure roller.

FIG. 2 illustrates the method of three dimensionally shaping an existing surface of a blank foam pad slab according to this invention in a rotary machine which is generally designated by the numeral 10. The machine 10 has a roller assembly which includes a die roller 12 and a pressure roller 14. This roller assembly is better seen in FIG. 3, where the rollers 12, 14 are seen to be mounted on parallel rotary shafts 16, 18 respectively. The shafts are supported in an appropriate machine frame and at least one of the two shafts is driven for rotation by a suitable motor drive, not shown in the drawings. The two shafts 16, 18 are spaced apart so that a gap exists between the outer circumference of the die cylinder 12 and the surface of the pressure roller 14, which gap is substantially smaller than the thickness of a synthetic foam slab 20. As the foam slab 20 is fed into the roller assembly, the pressure roller 14 with its smooth cylindrical surface 22 acts against the underside 24 of the slab so that the top surface 26 of the slab is pressed against the die roller 12. The die roller has a die surface generally designated by numeral 24 which in the illustrated example is comprised of raised portions or die elements 28 with planar hexagonal end surfaces 26 arranged in a honeycomb-like regular pattern such that each element 28 is spaced from six adjacent similar elements 28 by a slot recess 50 of constant width between each of the six sides 23 of the hexagonal element. That is, each side 23 of the hexagonal element 28 is parallel to and spaced from a side 23 of an adjacent hexagonal element 28. The die surface 24 of the roller 12 can be constructed either by machining a solid cylindrical roller body, as shown in FIG. 3, or by axially assembling a number of die rings 60 on the roller shaft 16' as shown in FIG. 7, each such die ring 60 carrying one circumferential row of die elements 28.

As better seen in FIG. 8, the spacing between the rollers 12, 14 is such as to force the upper surface 26 of the foam slab 20 against the die surface 24 with sufficient force to extrude foam portions 25 into the depressions 30, while portions 27 of the foam surface 26 underlying the flat end surfaces 26 are compressed against the pressure roller surface 22. Just beyond the point of minimum spacing between the rollers 12, 14, the slab 20 advances against a cutting edge 34 which is positioned between the rollers 12, 14 in a cutting plane tangent to the die surface 24 so as to slice through the advancing foam slab 20 and cut away those portions 25 of foam extruding into the depressions 30 between the die elements 28, while sparing the foam portions 27 compressed by the end surfaces 26. The foam slab 20 is cut in this fashion to produce a support pad 36 with a three-dimensionally shaped support surface 38, and a scrap sheet 39 which consists of the foam material extruded into the slots 26 and cut away from the slab 20. The scrap sheet 39 in this example is an open hexagonal mesh consisting of the material removed to make the recesses 50 and has a thickness equal to the depth of the recesses 50 in the pad 36.

Figure 4:
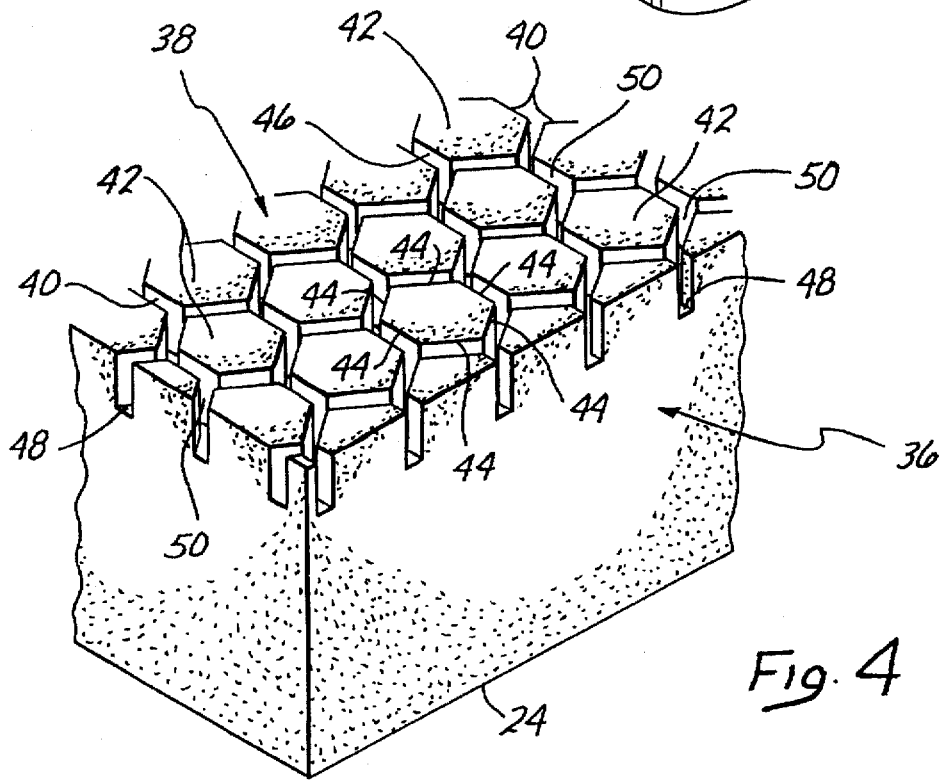
FIG. 4 is a perspective view showing a corner of the shaped surface of a foam pad made using the roller assembly of FIG. 3.

FIG. 4 shows one corner of the shaped support surface 38 of the pad 36 obtained by the method illustrated in FIG. 2. The three-dimensionally shaped surface 38 is substantially a mirror image of the die surface 24 on the roller 12, and includes raised support elements 40 which are hexagonal right angle prisms perpendicular to the flat bottom or undersurface 24 of the pad 36. Each support element 40 has a planar top surface 42, bounded by six side edges 44 and six vertical sides 46 extending between the end surface 42 and a slot bottom 48. The slot bottom surface 48 is generally planar and parallel to the underside 24 of the foam pad 36, and defines a common bottom for the depressions 50 which separate the individual support elements 40. The depressions 50 collectively define a hexagonal grid, i.e. a network consisting of hexagonal slots joined side to side over the entire shaped surface 38 of the support pad 36.

As is apparent from FIG. 4, the fraction of the shaped support surface 38 occupied by the end surfaces 42 of the support elements 40 is much greater than the fraction occupied collectively by the slots 50, i.e. by the total area of the bottom surface 48. This unequal proportion is beneficial in that the weight of the user's body is distributed over a relatively large support surface, i.e. the end surfaces 42, while the relatively narrow slots 50 provide sufficient ventilation between the individual support elements 40 to dissipate excessive humidity and heat. The support elements 40 are free to respond and adapt individually to the localized pressure and contour of the user's anatomy contacting each support element.

A particular advantage of the presently disclosed method for making foam pads with three-dimensionally shaped support surfaces is that the ratio of effective support surface (the collective area of end surfaces 42) to the pad area collectively occupied by the recesses 50, is continuously variable through a wide range and dependent only on the choice of geometry of the die surface 24. Another feature of this invention is that arbitrary geometric shapes of both the raised support elements 40 as well as the recessed areas 50 of the pad 36 are readily obtainable by suitable configuration of the die surface 24. In particular, it will be appreciated that the geometry of the recessed areas 50 is not necessarily dependent upon the geometry of the raised support elements 40. Such control over the ratio of support surface to recessed area on a support pad has not been previously possible by manufacture any known continuous rotary process such as convoluter machines, and therefore resort had to be made to either injection forming or pattern sawing of the foam pad.

In the previously known convoluting equipment such as shown in FIG. 1 of the drawings, the convoluted pad surfaces C1 and C2 only generally follow the geometry of the convoluter rollers R1 and R2, because of the relatively thick layer of foam, i.e. half the thickness of the foam slab S, interposed between the plane of the cutting blade B and the two convoluter rollers. This arrangement significantly limits the geometries of the convoluted surfaces obtainable by the prior art method. The contouring of the raised elements on the convoluter rollers tends to be smoothed and rounded off by the thickness of foam intervening between the blade B and the rollers. By contrast, the method of this invention permits fabrication of more finely detailed and precisely formed three dimensional support surfaces 38 with clean, sharp geometric features and edges. The shaped pad surfaces made according to this invention closely conform to the geometry of the die surface, and small support elements such as hexagons ¼ inch on each side and ⅛ inch high, separated by slots 1/16th inch wide, can be readily achieved with a die roller 12 as shown in FIG. 3. The height of the individual support elements 40 and the depth of the recesses 50 can be closely controlled by adjustment of the corresponding elements on the die roller surface 24.

The surface shaping process of this invention affords great flexibility in the three dimensional foam surface patterns which can be achieved. For example, the hexagonal die elements 28 are circumferentially staggered in adjacent rings 60 of the die roller in FIG. 7. However, the die elements 28 could also be aligned in rows extending along the length of the die cylinder 12'. Such an arrangement of the die surface would produce a shaped foam pad surface where the hexagonal raised portions 40 are arranged in a rectangular grid pattern with an attendant change in the configuration of the recesses 50 between the support elements 40. Likewise, the raised portions 40 can be arranged in different patterns with different spacing between the elements on different portions of the same foam pad by appropriate configuration of the die roller. Also the support elements 40 may vary in height over different portions of the foam pad 36, again by appropriately configuring the roller die surface 24.

Figure 5:
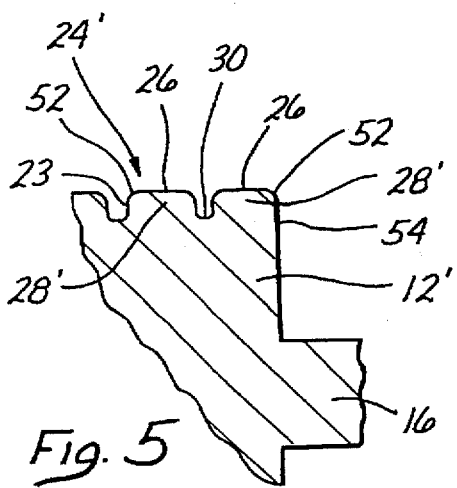
FIG. 5 is an enlarged fragmentary sectional view of the die roller showing the radiused transition between the flat end surface and the side surfaces of each raised element on the die surface.
Figure 6:
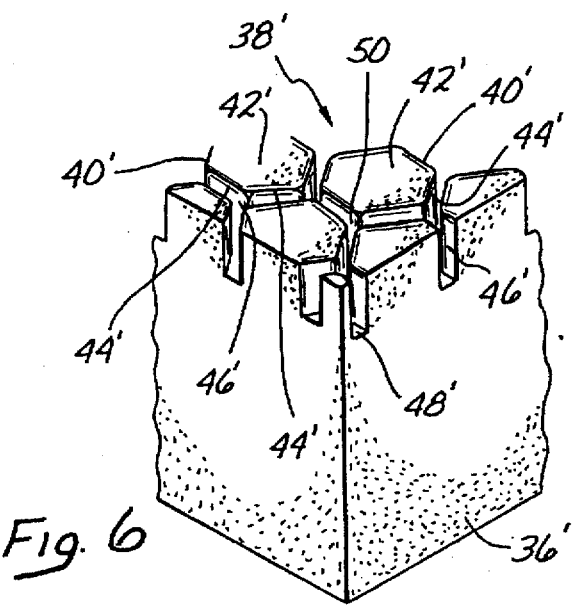
FIG. 6 is a perspective view of a corner of the shaped surface of a foam pad using the die of FIG. 5 and showing the resulting radiused edges around the flat end surfaces of the raised portions of the shaped foam surface.

Yet another important advantage of this invention is illustrated in FIGS. 5 and 6, where the raised die elements 28' of the die roller 12' have radiused side edges 52 forming a smoothly contoured convexly curved transition between the top surfaces 26 and the side surfaces 54 of each die element. This is in contrast to the sharp side edges defined between the end surface 26 and the sides 23 of each die element 28 of FIG. 3. The contoured die elements 28' in FIG. 5 produce similarly contoured support elements 40' on the resulting shaped foam surface of the support pad 36'. The pad 36' in FIG. 6 differs from the pad 36 in FIG. 4 in that the edges 44 of the support elements 40 in FIG. 4 are convexly radiused to a contour similar to that of the die elements 28' of the die roller 12' in FIG. 5. The support elements 40' have a flat, planar end surface 42' bounded by radiused edges 44' which provide a smooth, rounded transition between the end surface 42' and each side surface 46' of the support elements 40'. The radiused transition between the flat end surface 42' and the flat side surfaces 46' is beneficial in that a pressure gradient is created against the anatomy of the user in which the force exerted by the end surface 42' against the user's skin tissues diminishes gradually toward the surrounding slot 50. This is in contrast with a more abrupt transition in supporting force provided by elements 40 in FIG. 4, where the sharper side edges 44 of each support element 40 may have a tendency to press into the user's skin tissues, applying localized pressure which may reduce blood flow across the pressure line formed by each edge 44. This undesirable result can be controlled in various ways, as by selection of the foam density and resilience, and size and spacing of the support elements 40, among other factors. However, the elimination of the sharp transition at the side edges 44 as illustrated in FIGS. 5 and 6 provides a positive solution not available with previously used convoluting roller machines, which as already explained, tend to produce rounded, peaked protuberances on the convoluted pad surface. While these can be cut subsequently with a band saw or the like to produce flat tops, the tops have sharp edges which may cut into soft tissue of the user and interfere with blood circulation. No convenient solution to this shortcoming was available with prior art convoluter manufacturing methods.

The feature just described in connection with FIGS. 5 and 6 can be further extended, as in FIGS. 9 and 10, to include rounding of the bottom edges of the foam support elements 40' where the support elements 40' intersect the bottom surface 48 of the shaped pad surface 38'.

FIG. 9 shows a die roller 12" with a modified die surface generally indicated by numeral 24" which is similar to the die surface 24 in FIG. 3 except in that the top edges 52" are smoothly contoured to a convex radius, similarly to the roller 12' in FIG. 5, and also has concavely radiused bottom edges 56" at the intersection of the bottom surface 48" with the side surfaces 54" of the die elements 40". The resulting shaped foam surface 38" is shown in FIG. 10, where the foam support elements 40" have convexly radiused upper edges 44" and also have concavely radiused lower edges 58 at the base of each support element 40" where the side surfaces 46" meet the bottom surface 48" of the recesses 50" which separate the support elements 40". The radius of curvature of both the top and bottom edges may be substantially larger than shown in FIG. 10, and the curvatures of the top and bottom edges 44", 58 respectively are independent of each other. The radius of curvature of the upper edges 44 may be enlarged to replace the planar top surface 42" with a continuously curved bubble-shaped surface. Also, the curvature of the top and bottom edges may be enlarged to achieve a smooth continuously curved transition between the concave and convex curvatures along the sides of the support elements 40". Consequently, a wide range of geometries of the elevational cross-section of the support elements 40" is readily obtainable, thereby offering many options to the pad designer for optimizing body support while reducing areas of concentrated pressure against the user's tissues.

Still another feature of this invention is that opposite surfaces 26, 24 of the foam slab blank can be shaped independently of each other by turning over the slab in two separate passes through the machine 10 in FIG. 2. Each side of the foam pad 36 can be given entirely different three dimensional surface patterns by changing the die roller between passes through the machine 10.

In summary, it will be appreciated that the method and apparatus of this invention described above and illustrated in the accompanying drawings provides a method and apparatus for the continuous manufacture of foam pads with three-dimensionally shaped support surfaces of arbitrary geometry with a high degree of control over the geometric configuration of the three-dimensionally shaped pad surface in a single pass through a die/pressure roller assembly, and which overcomes a number of shortcomings of previously known convoluter roller machines used for making convoluted foam pads.

While a presently preferred form of the invention has been described and illustrated for purposes of clarity and example only, it will be understood that many changes, substitutions and modifications to the described embodiments will become readily apparent to those possessed of ordinary skill in the art without thereby departing from the scope and spirit of the present invention which is defined by the following claims.

What is claimed is:

1. Apparatus for shaping a sheet of resiliently compressible synthetic foam to a desired three dimensional surface geometry, comprising:

a continuous three dimensional die pattern surface;

a compression element for compressing a sheet of foam against said pattern surface;

a cutting edge; and motor means for turning one or both of said die pattern surface and said compression element thereby to urge said sheet of foam against said cutting edge in a compressed condition such that portions of said sheet of foam passing between said cutting edge and said pattern surface are cut away from said sheet of foam;

said cutting edge being sufficiently closely adjacent to said die pattern such that said three dimensional die pattern surface is substantially reproduced with little or no geometric distortion on said sheet of foam.

2. The apparatus of claim 1 wherein said cutting edge is positioned in approximately tangential relationship with said pattern surface.

3. The apparatus of claim 1 wherein said motor means turns aid pattern surface continuously and said sheet of foam is longer than a length of one revolution of said pattern surface, such that said pattern surface is substantially reproduced multiple times along said sheet of foam.

4. The apparatus of claim 1 arranged and configured to produce a continuous length of scrap foam cut away from said beet of foam, said continuous length of scrap foam being coextensive in length with said sheet of foam.

5. The apparatus of claim 1 wherein said pattern surface has a cylindrical curvature and said cutting edge is in said approximately tangential relationship with said cylindrical curvature of the die pattern surface.

6. The apparatus of claim 1 wherein said pattern surface has top surfaces and bottom surfaces connected by side surfaces along top side edges and bottom side edges respectively, said compression element and said cutting edge being arranged and configured so that said top surfaces, bottom surfaces, side surfaces, top side edges and bottom side edges are substantially reproduced on said sheet of foam.

7. The apparatus of claim 6 wherein one or both of said top side edges and said bottom side edges are radiused, and said one or both of said top side edges and said bottom side edges are reproduced on said sheet of foam substantially similarly radiused.

8. The apparatus of claim 1 wherein said compression element comprises a compression roller spaced from said pattern surface to define therebetween a gap having an input side for admitting said sheet of foam and an output side, said gap including a point of minimum spacing between said pattern surface and said compression roller, said cutting edge being positioned in substantially tangent relationship with said pattern surface just beyond said point of minimum spacing on said output side.

9. The apparatus of claim 1 wherein said sheet of foam has an original surface and said compression element presses said original surface against said pattern surface, and said cutting edge is positioned so as to preserve at least part of said original surface in the pattern reproduced on said sheet of foam.

10. The apparatus of claim 1 wherein said pattern surface defines a top surface with recessed portions, and said cutting edge is positioned in approximately tangential relationship to said top surface.

11. The apparatus of claim 10 wherein said cutting edge is positioned so as to spare from cutting away foam portions of said sheet compressed against said top surface.

12. Apparatus for shaping a sheet of resiliently compressible synthetic foam to a desired three dimensional surface geometry, comprising:
   a continuous three dimensional die pattern surface having a top surface and recessed portions;
   a substantially smooth surfaced compression roller spaced from said pattern surface to define therebetween a gap having an input side for admitting a sheet of foam and an output side, said gap including a point of minimum spacing between said pattern surface and said compression roller for compressing said sheet of foam against said pattern surface;
   a cutting edge spaced from said compression roller and positioned in substantially tangent closely adjacent relationship with said top surface just beyond said point of minimum spacing; and
   motor means for continuously turning one or both of said die pattern surface and said compression element thereby to urge said sheet of foam against said cutting edge in a compressed condition such that substantially only portions of said sheet of foam compressed into said recessed portions are cut away from said sheet of foam;
   said cutting edge being positioned in relation to said three dimensional die pattern surface such that said pattern surface is substantially reproduced on said sheet of foam multiple times along a said sheet of foam of indeterminate length greater than one length of revolution of said pattern surface while cutting away a continuous length of scrap foam away from said sheet of foam consisting substantially only of foam compressed into said recessed portions.

13. The apparatus of claim 12 arranged and configured to produce a continuous length of scrap foam cut away from said sheet of foam.

14. The apparatus of claim 12 wherein said pattern surface has top surfaces and bottom surfaces connected by side surfaces along top side edges and bottom side edges respectively, said compression element and said cutting edge being arranged and configured so that said top surfaces, bottom surfaces, side surfaces, top side edges and bottom side edges are substantially reproduced on said sheet of foam.

15. The apparatus of claim 14 wherein one or both of said top side edges and said bottom side edges are radiused, and said one or both of said top side edges and said bottom side edges are reproduced on said sheet of foam substantially similarly radiused.

16. Apparatus for shaping a sheet of resiliently compressible synthetic foam to a desired three dimensional surface geometry, comprising:
   a continuous three dimensional die pattern surface having top surfaces and bottom surfaces intersected by side surfaces along top side edges and bottom side edges respectively;
   compression means defining a gap with said pattern surface for compressing a sheet of foam against said pattern surface;
   a cutting edge positioned in said gap closely adjacent to said top surfaces and spaced from said compression means; and
   motor means for turning one or both of said die pattern surface and said compression means thereby to urge said sheet of foam through said gap against said cutting edge in a compressed condition such that portions of said sheet of foam passing between said cutting edge and said pattern surface are cut away from said sheet of foam;
   said compression means and said cutting edge being arranged and configured so that said top surfaces, bottom surfaces, side surfaces, top side edges and bottom side edges are substantially reproduced on said sheet of foam.

17. The apparatus of claim 16 wherein one or both of said top side edges and said bottom side edges are radiused, and said one or both of said top side edges and said bottom side edges are reproduced on said sheet of foam substantially similarly radiused.

18. The apparatus of claim 16, said gap having an input side for admitting said sheet of foam and an output side, said gap including a point of minimum spacing between said pattern surface and said compression roller, said cutting edge being positioned in substantially tangent relationship with said pattern surface just beyond said point of minimum spacing on the output side of said gap.

19. Apparatus for shaping a sheet of resiliently compressible synthetic foam to a desired three dimensional surface geometry, comprising:
   a three dimensional die pattern surface having at least partially planar top surfaces and bottom surfaces connected by side surfaces along relatively sharp top side edges and bottom side edges respectively;
   a substantially smooth surfaced compression roller spaced from said pattern surface to define therebetween a gap having an input side and an output side, said gap including a point of minimum spacing between said pattern surface and said compression roller;
   a cutting edge spaced from said compression roller in said gap and positioned in substantially tangent closely adjacent relationship with said pattern surface just beyond said point of minimum spacing; and motor means driving one or both of said die pattern surface for continuous rotation in opposite senses such that a sheet of foam compressed in said gap against said pattern surface is driven against said cutting edge in a compressed condition and portions of said sheet of foam passing between said cutting edge and said pattern surface are cut away from said sheet of foam and said at least partially planar top surfaces, bottom surfaces, side surfaces, and said relatively sharp top side edges and bottom side edges are substantially reproduced on said sheet of foam continuously along said sheet of foam with each revolution of said pattern surface.

20. The apparatus of claim 19 arranged and configured to produce a continuous length of scrap foam cut away from said sheet of foam.

21. The apparatus of claim 19 wherein one or both of said top side edges and said bottom side edges are radiused, and said one or both of said top side edges and said bottom side edges are reproduced on said sheet of foam substantially similarly radiused.

* * * * *